Dec. 25, 1923.
W. W. BLAKELY
1,478,505
SECURING DEVICE FOR VEHICLES
Filed Dec. 5, 1921
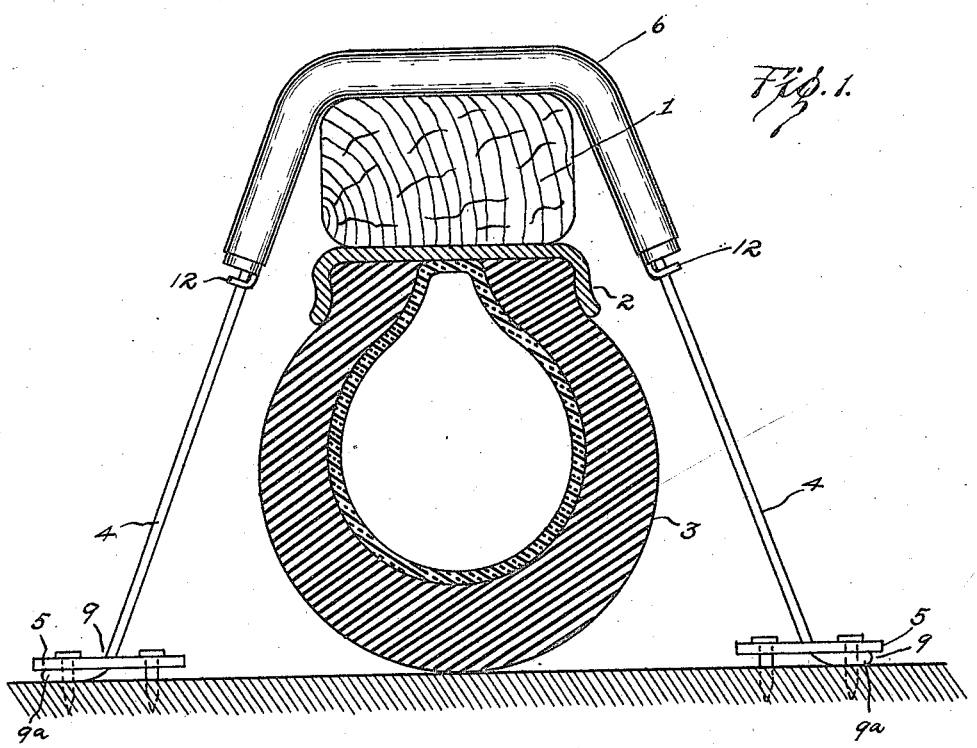
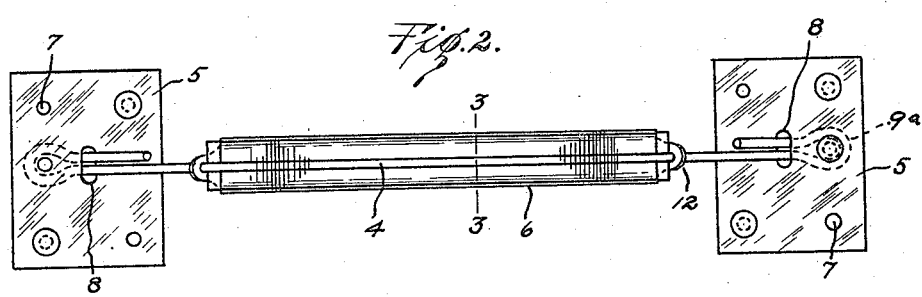
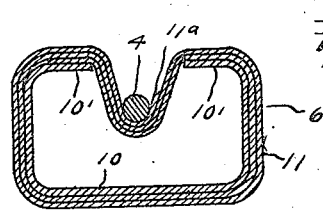
Inventor
William W. Blakely Patented Dec. 25, 1923.

1,478,505

UNITED STATES PATENT OFFICE.

WILLIAM W. BLAKELY, OF DETROIT, MICHIGAN.

SECURING DEVICE FOR VEHICLES.

Application filed December 5, 1921. Serial No. 519,820.

*To all whom it may concern:*

Be it known that I, WILLIAM W. BLAKELY, a citizen of the United States of America, residing at Detroit, in the county of Wayne and State of Michigan, have invented certain new and useful Improvements in Securing Devices for Vehicles, of which the following is a specification, reference being had therein to the accompanying drawings.

This invention relates to securing devices for vehicles, and more particularly to devices for securing vehicles, for safe shipment, to the floors of freight cars or vessels.

It is the object of the invention to provide a vehicle securing device that will engage the vehicle by straddling the felly of a wheel thereof, and will be attachable to the surface supporting the vehicle at each side of the engaged wheel.

A preferred embodiment of the invention is hereinafter described, and is illustrated in the accompanying drawing, wherein:

Figure 1 is a view showing in cross-section the rim portion of a wheel, and showing the invention applied thereto;

Figure 2 is a view of the same;

Figure 3 is a cross-section view of the bearing member of the device, the section being taken on line 3—3 of Figure 2.

In these views, the reference character 1 designates the felly of a motor vehicle wheel, 2 the rim thereof, and 3 a tire mounted upon said rim. The securing device, shown in engagement with the felly 1, is comprised of an arched rod or wire 4, straddling the felly, attachment plates 5 respectively carried by the extremities of the arch 4, and a bearing member 6 carried by the top portion of said arch. The arch 4 has a horizontal top portion of a width to extend across the felly, and a pair of downwardly divergent leg portions. Each of the plates 5 is formed with a plurality of holes 7 to adapt said plates to be nailed to a floor, and a central slot 8 in each plate loosely receives the corresponding foot portion 9 of the arch 4. The foot portions 9 are formed by return bending or doubling the end portions of the arch-forming wire, engaged by the plates 5 and spreading apart the adjacent portions of said wire below said plates to form loops 9ª, holding said plates in assembled relation with the feet 9. Preferably said loops are bent in opposite directions so as to extend approximately parallel to said plates when the latter are nailed to a floor (see Fig. 1). Also, as is seen in Figure 2, the terminal portions of the arch-forming wire may be given a slight divergence above the plates 5 to the leg portions of the arch so as to prevent the plates slipping upwardly upon the arch and so disengaging from their proper engagement with the foot portions 9.

The bearing member 6 comprises a channel-shaped sheet metal element 10 bent to adapt it to embrace the horizontal top of the arch 4 and also the upper portions of the legs of the arch. The top of the channel member 10 is partially closed by flanging the sides of said member inwardly as indicated at 10', a sufficient opening being left between said flanges to allow a ready engagement of the member 4 within the channel element. 11 is a piece of fabric, preferably of rather soft texture, which is wound several times around the element 10, prior to engagement of said element with the arch member and which is held in place by the latter member when the parts are assembled, said fabric being depressed into the channel element by the member 4, so as to tighten the fabric upon the channel element. It is preferred to substantially register the outer terminal edge portion 11ª of the fabric 11 with the opening between the flanges 10ª so that said edge portion will be firmly engaged beneath the upper portion of the arch member when the latter is inserted in the channel element, it thus being unnecessary to make any other provision for preventing the fabric from unwinding. Terminally the element 10 is formed with upwardly bent tongues 12 which are apertured for engagement by the legs of the arch 4, and thus form the means for holding the arch and bearing member assembled.

In the formation of the described article, the fabric 11 is applied to the channel element 10 while the latter is straight, and the wire 4, before being bent, is engaged in the channel element 10 and passed through the tongues 12 thereof. The article is then completed by bending the wire 4 and bearing member 6 in unison to secure the desired arch shape, fashioning the foot portions of the arch member, and engaging the plates 5 therewith as has been hereinbefore described.

The described securing device is of an inexpensive construction and is adapted to be quickly applied to or removed from a vehicle. The bearing member affords a sufficiently wide bearing surface upon the felly to prevent the latter being indented by the securing device when the latter is under stress, and the fabric facing upon the bearing member protects the finish of the felly from being scratched or marred by the device. The loose engagement of the arch member 4 with the plates 5 permits a limited swinging of the arch member responsive to vibration and minor shocks acting upon the engaged vehicle and thus reduces the strain upon said plates.

What I claim as my invention is:

1. A vehicle securing device comprising a tie member, a channel-shaped member carried by said tie member to bear upon a wheel of the secured vehicle, the tie member being extended through the channel of said bearing member, and tongues upturned upon the end portions of the bearing member having apertures engaged by the tie member to retain the bearing member thereupon.

2. A vehicle securing device comprising an elongated tie member, a slotted bearing member carried thereby, a padding member engaging the bearing face of the bearing member and retained in engagement with said face by the engagement of said tie member in said slot.

3. A vehicle securing device comprising an elongated tie member, a channel-shaped member carried by the tie member to bear upon a wheel of the secured vehicle, a padding member carried by the bearing member formed by a fabric wound upon the bearing member, said fabric being engaged by the tie member to prevent its unwinding.

4. A vehicle securing device comprising an elongated tie member, a channel-shaped member carried by said tie member to bear upon a wheel of the secured vehicle, the tie member being extended through the channel of said bearing member, and a padding member carried by the tie member and comprised by a fabric wound upon the bearing member and having a portion deflected by the tie member into the channel of the bearing member.

5. A vehicle securing device comprising an arch-shaped tie member having leg portions and a connecting portion, a channel-shaped bearing member bent to engage the connecting portion and upper parts of the legs of said tie member, a padding member formed by a fabric embracing said channel-member, the said fabric being deflected by said tie member into the channel member to maintain its engagement with the bearing member.

6. A vehicle securing device comprising a U-shaped bearing member provided with a longitudinally extending slot along the outer face thereof, padding material disposed along the inner or bearing face thereof, and a tie member adapted to engage in said slot for securing the bearing member in position.

7. A device of the class described comprising a member having a longitudinally extending channel therein, a member located in said channel, and a padding surrounding the first-mentioned member and forming a bearing for the last-mentioned member in said channel.

8. A device of the class described comprising a member having a longitudinally extending channel therein, a rod located in said channel, and a padding upon the first-mentioned member and supporting said rod in said channel.

9. A device of the class described comprising a channel-shaped member, a tie member extending between the sides of said channel-shaped member, a padding upon said channel-shaped member supporting said tie member, and means for holding the channel-shaped member in engagement with said tie member.

In testimony whereof I affix my signature.

WILLIAM W. BLAKELY.